United States Patent Office 3,360,378
Patented Dec. 26, 1967

3,360,378
LOW CALORIE MARGARINE SUBSTITUTE PRODUCT
Joseph George Spitzer, Mamaroneck, and Lloyd I. Osipow, New York, N.Y.
No Drawing. Continuation of application Ser. No. 515,253, Dec. 20, 1965. This application July 12, 1967, Ser. No. 652,666
20 Claims. (Cl. 99—123)

ABSTRACT OF THE DISCLOSURE

This invention relates to a low calorie margarine substitute product in the form of a stable water-in-oil emulsion. The margarine substitute product of the invention has the flavor, body and functional characteristics of conventional margarine, but is of a lower caloric content due to its higher water and lower oil content than normal margarine.

The stable plastic edible margarine substitute composition of the invention consists essentially of at least 45% by weight of water and from 20 to 55% oleaginous ingredients consisting essentially of an edible oil as the predominant oleaginous material and an emulsifying system.

---

This application is a continuation application of copending application Ser. No. 515,253 filed Dec. 20, 1965, now abandoned, which in turn, is a continuation application of now abandoned Ser. No. 372,707 filed June 4, 1964 which in turn is a continuation-in-part of now abandoned parent application Ser. No. 206,183 filed June 20, 1962.

This invention relates to a stable plastic edible low-calorie margarine-substitute product and method of producing same. A product of this type is intended to be eaten by people who wish to reduce their intake of fat calories for reasons of health or appearance, without sacrificing their normal cooking and eating habits. A number of difficult requirements must be met, if a low-calorie margarine-substitute is to be acceptable to the general public.

A suitable low-calorie margarine-substitute must be manufactured from non-toxic ingredients. It should not only have the flavor of normal margarine, but it also should have the body and functional characteristics thereof. Accordingly, it should possess firmness in the cold to permit the manufacture of the margarine-substitute product in print form and the slicing of patties. Then, too, it should be capable of retaining its solid characteristics at room temperature for an appreciable period of time, i.e. exhibit good stand-up qualities. In addition, it should melt rapidly at elevated temperatures, e.g. on hot foods such as toast, vegetables, in a frying pan, such property being commonly referred to as the "melting rate" of the product. Moreover, such product should be capable of melting in the mouth when the margarine-substitute product is eaten as such or as a solid along with other food. Also, when used for shallow frying, a suitable margarine-substitute product should act as a release agent.

The objects and advantages of the invention will be set forth hereinafter and in part will be obvious herefrom, or may be learned by practice with the invention, the same being realized and attained by means of the compositions, steps and methods pointed out in the appended claims.

The invention consists of the novel compositions, steps and methods herein described.

An object of this invention is to provide a margarine-substitute product which has the flavor, body and functional characteristics of normal margarine, but is of a lower caloric content. A further object of this invention is to provide a low-calorie margarine-substitute product which has the flavor, firmness, good stand-up qualities and quick-melting properties of normal margarine. Another object of this invention is to provide a margarine-substitute product, which when used for frying or baking, acts as a releasing agent. A still further object of this invention is to provide a novel method for the manufacture of a margine-substitute product having the properties set forth in the foregoing objects.

It has been found that the objects of this invention may be realized by producing a stable plastic edible margarine-substitute composition having a flow point in the range of 65 to 105° F., preferably 75 to 105° F., and a penetrometer reading at 40° F. of 20 to 250, preferably 35 to 150, using a standard grease cone (3.2 cm. diameter, 45° angle, 150 grams added weight, 5 second interval), and being in the form of a water-in-oil emulsion. More particularly, the compositions of this invention contain an appropriate amount of water and from 20 to 55 percent by weight of oleaginous ingredients consisting essentially of an edible oleaginous material including 0.1 to 13% by weight of an oleaginous emulsifying system selected from the group consisting of (a) emulsifying agents containing a component insoluble in both water and oil phases and preferentially but incompletely wet by the oil phase so as to give a contact angle greater than 90° but less than 180° measured in the water phase at the oil-water emulsifier film interface; and (b) oil-soluble emulsifying agents that form a condensed film at the oil-water interface. The objectives of the invention are best obtained when water is in an amount of at least equal to the weight of the oleaginous components.

The term "low-calorie" as applied to the margarine-substitute product of our invention means that the caloric content of such product, compared to conventional margarines, has been reduced in an amount at least 25% and, preferably, at least 40%. By the term "conventional margarine" as used herein, we mean a margarine having at least 80% by weight of oleaginous components.

Products having the best mouth feel are those which have a melting or flow point at or below body temperature. In determining the flow point of the low-calorie margarine-substitute products of this invention, the following procedure was employed:

A 5 to 10 mg. sample previously conditioned to 65° F. is pressed lightly between two microscope cover glasses. The sample is placed on the hot plate of a Fisher-Johns melting point apparatus and the temperature increased to obtain approximate flow point range. When this range has been determined, the heating element is turned off, and as the temperature slowly drops, a fresh sample is placed in position and 30 seconds allowed to observe product flow. This procedure is continued using fresh samples until the appropriate flow point (i.e. the sample just barely flows in 30 seconds) is obtained.

As indicated hereinbefore, it is desirable that the low-calorie margarine products of this invention have a suitable melting rate at elevated temperature. A procedure that may be used for determining melting rate is as follows:

(1) Place a 1" x 1¼" x 1¼" sample at 40° F. in a small frying pan. The sample is placed on the square face. The frying pan is at 65–75° F.

(2) Invert a small watch glass (approximately 2 inches in diameter, weight—6.2 gms.) and place it firmly on the sample.

(3) Place the frying pan containing the sample and watch glass on a previously-heated hot plate set at low heat (Fisher, Heavy Duty Hot Plate 660 watts).

(4) The height of the sample is measured when the frying pan contacts the hot plate and the rate of slump is measured. A convenient way to do this is by placing a Koehler penetrometer with a dial calibrated in 1/10 millimeters (mm.), over the sample and bringing the needle stem in contact with the watch glass. The needle stem weighs 15.5 gms. The reading of the penetrometer is recorded and measurements are made at 15-second intervals.

(5) For convenience, the rate of melting is reported as the change in height of the sample in 1/10 mm. in a 60 second interval.

Low-calorie margarine-like products formed in accordance with this invention have a suitable melting rate, when tested by the above procedure, when a sample of such product shows a reduction in height in the range of 3 to 12 mm., and preferably 7 to 10 mm.

In the production of the margarine-like products of this invention containing a lesser amount of oil than conventional margarine, one cannot merely use a lesser amount of oil but employ conventional techniques utilizing the components required by the standards of identity for margarine. To illustrate this point, in the United States the inclusion of milk solids, equivalent milk derivatives or ground soy beans in conventional margarine is required by the standards of identity for margarine. If this required concentration of milk solids is added to the low-calorie products of our invention, the emulsion either becomes unstable or inverts to an oil-in-water emulsion. The same thing occurs if other proteinaceous matter, e.g. soy proteinates, are substituted for milk solids. As will be described in detail hereinafter, this invention does not preclude the utilization of special techniques whereby a low-calorie product may be obtained containing proteinaceous matter such as milk solids.

Sulfoacetate derivatives of glyceryl esters of fatty acids are sometimes used as emulsifiers for conventional margarine. When employed in our compositions containing 55% or less fatty components, they have a deleterious effect even if milk solids are omitted.

Emulsifiers or combinations of emulsifiers allowable in conventional margarine that can be used in the practice of our invention are certain combinations of lecithin with glyceryl esters of fatty acids. We have found that these glyceryl esters may be mono- or di-esters of 12 to 22 carbon atom fatty acids or mixtures of these. However, they must be soluble in the margarine oil at the concentration used. Otherwise, they will not form stable products. Glyceryl esters that have a high content of glyceryl monostearate or glyceryl monopalmitate, e.g., more than about 50 percent, are insufficiently soluble in margarine oils and no not form stable compositions in accordance with our invention, although they are useful for preparing conventional margarines. Combinations of the preferred glyceryl esters and lecithin do not form stable water-in-oil emulsions with less than 55 percent fatty material when milk solids are added.

Several possible reasons may be given why these emulsifier combinations perform satisfactorily in conventional margarines containing about 15 percent of water, but fail completely when the water content is increased to about 45 percent or more. For one thing, the very high ratio of oil to water in conventional margarines is overwhelmingly favorable to the formation of water-in-oil emulsions. Reasonably satisfactory emulsions can be prepared with this oil to water ratio without the addition of emulsifiers. Possibly free fatty acids and glyceryl diesters normally present in commercial margarine oils provide sufficient emulsifying action.

Ionic emulsifiers, such as the sulfoacetate derivatives of glyceryl esters and proteinates, including the caseinates found in milk, promote the formation of oil-in-water emulsions. Consequently, the addition of these emulsifiers to water-in-oil emulsions containing a high amount of water, e.g., 50% water, causes the emulsions to break or invert. However, if only a small amount of water is present, these ionic emulsifiers are ionized to a lesser extent and do not fully exhibit their tendency to promote the formation of oil-in-water emulsions. Also, as pointed out previously, the high oil to water ratio of conventional margarines is conducive to the formation of water-in-oil emulsions. We find that the adverse effect of the addition of milk solids can be reduced by adding salts of multivalent cations, such as calcium chloride. This salt addition would have the effect of decreasing the ionization of the proteinaceous material.

Lecithin and other phospholipids are amphoteric emulsifiers. At their isoelectric point they provide an interfacial film that is electrically neutral and should be conducive to the formation of water-in-oil emulsions. On either side of the isoelectric point, the interfacial film would be electrically charged and would promote the formation of the reverse type of emulsion. We find that while these phospholipids, on either side of their isoelectric point, can be used as the sole emulsifier in the preparation of conventional margarines, they cannot be so employed in our compositions, which contain a high water content. Instead, we find that it is necessary to add an ancillary emulsifier that is soluble in the margarine oil, is nonionizing, and is capable of ion-dipole interaction with the phospholipid. Examples of such emulsifiers are stearic acid and glyceryl dioleate. We speculate that this ion-dipole interaction between the oil soluble, polar emulsifier and the phospholipid effectively screens the electrical charge of the phospholipid and thus favors the formation of a water-in-oil emulsion.

Glyceryl esters used in excess of their solubility in the margarine oil are useful emulsifiers for conventional margarines. However, they have a deleterious effect on our compositions. We have found that cast films of these glyceryl ester emulsifiers, instead of exhibiting a modest preferential wetting by the oil phase, are practically completely wet by the oil phase, displacing the water phase. Consequently, they do not function as effective emulsifiers.

Many oil soluble emulsifiers can be used alone in conventional margarines, but not in the compositions of our invention. Examples of such emulsifiers are propylene glycol monostearate and glyceryl dioleate. We have found that satisfactory compositions in accordance with our invention can be prepared if we also add fatty acids, such as stearic or palmitic. The combination of these long-chain fatty acids with hydroxy ester emulsifiers results in strong hydrogen bonds and the formation of condensed films at the water-oil interface.

The term "condensed film" refers to the physical state of the two-dimensional emulsifier phases at the oil-water interface. Two-dimensional phases are analogous to those in three dimensions, and may be gaseous or condensed, i.e., liquid or solid. At the oil-water interphase, van der Waals' interaction between the hydrocarbon chains of the emulsifier molecules is largely negated by the presence of the oil phase. Consequently, the interfacial film is generally gaseous. However, if there is strong interaction between the polar groups of the emulsifier molecules, the interfacial film is condensed. Surface phases, their characteristics, and methods for their determination are described in a number of books dealing with surface chemistry, including: Harkins, W. D., "The Physical Chemistry of Surface Films," New York, Reinhold Publishing Corp., 1952.

In the preferred embodiment of our invention we employ an emulsifying agent that is insoluble in both the oil phase and the water phase and is preferentially, but incompletely, wet by the oil phase. The term "insoluble" is a relative one and refers to the condition of the emulsifier during the formation of the emulsion. If the concentration of emulsifier and the temperature and other conditions of preparation of the emulsion are such that part of the emulsifier is not in solution, the emulsifier is characterized as an insoluble emulsifier. Lecithin is soluble in margarine oils. However, in the usual method of preparation of the compositions of our emulsion, the lecithin becomes hydrated and insoluble in both phases.

We determine the wettability of an insoluble emulsifier by first spreading it on a glass microscope slide. We then immerse the slide in water to allow the emulsifier film to become fully hydrated. The slide coated with the hydrated emulsifier film is then transferred to a vessel partially filled with the aqueous phase, previously warmed so that its temperature is slightly above the melting point of the oil phase. After heating the oil phase to liquefy, it is poured gently over the water phase. The contact angle formed by the two liquid phases and the emulsifier film is measured through the water phase. If the contact angle is greater than 90°, the emulsifier film is preferentially wet by the oil phase. If the contact angle is 180°, the emulsifier film is completely wet by the oil phase.

In Table 1 we have listed examples of emulsifying agents that, when hydrated, are insoluble in both oil and water phases, and can be used in the practice of our invention. The examples in Table 1 include phospholipids and sorbitan monoesters of 12–22 carbon atom fatty acids. These insoluble emulsifiers are generally not preferentially wet by pure margarine oils. Consequently, they generally do not give stable water-in-oil emulsions when the aqueous phase is about 45 percent or more of the total composition. However, these insoluble emulsifier films will become preferentially, but incompletely, wet by the oil phase if oil-soluble emulsifying agents are incorporated in the oil phase.

TABLE 1

| | |
|---|---|
| Lecithin | Sorbitan monostearate |
| Cephalin | Sorbitan monooleate |
| Inositol phosphatides | Sorbitan monopalmitate |
| Sorbitan monolaurate | Sorbitan sesquioleate |
| Sorbitan monomyristate | |

In Table 2 are examples of emulsifying agents that are soluble in margarine oils and can be used in combination with the insoluble emulsifiers to obtain stable water-in-oil margarine substitutes. The examples of Table 2 are illustrative of 12–22 carbon atom fatty acids, their glyceryl esters and their sorbitan triesters. Commercial glyceryl monoesters and glyceryl diesters vary considerably in composition. A commercial glyceryl diester may contain as much monoester as diester. Further, they are ordinarily esters of mixed fatty acids, with considerable variation in composition. One grade of glyceryl distearate may be soluble in a particular margarine oil, and other grades may be insoluble. Both grades may be soluble in a different margarine oil. In selecting an emulsifier for use in combination with an insoluble emulsifier from Table 1, the important criterion is that the emulsifier is soluble in the particular margarine oil selected.

TABLE 2

| | |
|---|---|
| Oleic acid | Sorbitan tristearate |
| Palmitic acid | Glyceryl dioleate |
| Stearic acid | Glyceryl dipalmitate |
| Sorbitan trioleate | Glyceryl distearate |
| Sorbitan tripalmitate | Glyceryl monooleate |

The insoluble and soluble emulsifiers are combined in such proportions that when tested in a manner described hereinbefore, the insoluble emulsifier film is preferentially, but incompletely, wet by the oil phase. In the aforementioned insoluble and soluble emulsifier combination, each component comprises at least 10 percent by weight of total emulsifiers. With the more hydrophilic emulsifiers of Table 1, higher concentrations of oil-soluble emulsifiers (Table 2) are required. We may use as little as 0.1 percent or as much as 15 percent of the emulsifier combination. However, with the higher levels of emulsifier the low-calorie margarine substitute does not melt readily in a frying pan, and the mouth feel is less satisfactory. Consequently, we prefer to use a minimum amount of the emulsifier combination, i.e., 0.1 to 2 percent. At these low levels of emulsifier, more stable products are obtained if more than half of the emulsifier is of the oil soluble type.

Also, as indicated hereinbefore, suitable emulsifier systems for the practice of this invention are oil-soluble emulsifying agents, either a single emulsifier or a combination of emulsifiers, that form a condensed film at the oil-water interface. We have discovered two general classes of oil-soluble emulsifier systems that can be used successfully in the absence of insoluble emulsifiers as exemplified in Table 1. These are: (a) hydroxy esters of 12–22 carbon atom fatty acids containing at least two hydroxyl groups that are not on adjacent carbon atoms. This requirement avoids intramolecular hydrogen bonding. The sorbitan triesters of 12–22 carbon atom fatty acids are examples of emulsifiers meeting these requirements. (b) Combinations of 12–22 carbon atom fatty acids and hydroxy esters of these fatty acids. Emulsifying systems of the aforedescribed type are generally used in an amount of 0.1 to 15% by weight, and preferably 0.3 to 10% by weight.

In Table 3 are examples of emulsifiers and emulsifier combinations that are soluble in margarine oils and form a condensed film at the oil-water interface and produce stable water-in-oil emulsions. These are examples of 12–22 carbon atom fatty acids in combination with their glyceryl mono- and di-esters, their propylene glycol monoesters and their sorbitan triesters, as well as the sorbitan triesters of these fatty acids without ancillary emulsifier. As noted hereinbefore, commercial hydroxy esters and margarine oils vary considerably in composition, and it is necessary to select a grade of emulsifier that remains soluble in the margarine oil during the formation of the emulsion.

TABLE 3

| | |
|---|---|
| Sorbitan trioleate | |
| Sorbitan tripalmitate | and mixtures thereof. |
| Sorbitan tristearate | |

| | | |
|---|---|---|
| Stearic acid | | Glyceryl monooleate. |
| Palmitic acid | with | Glyceryl dioleate. |
| Oleic acid | | Propylene glycol monostearate. |
| | | Propylene glycol monopalmitate. |
| | | Propylene glycol monooleate. |
| | | Sorbitan trioleate. |
| | | Sorbitan tripalmitate. |
| | | Sorbitan tristearate. |

At the same level of emulsifier, the systems containing an insoluble emulsifier produce more stable emulsions than those without a suitable insoluble emulsifier. As indicated above, we may use from 0.1 to 15 percent of the emulsifier combinations shown in Table 3. Preferably, we use from 0.3 to 10 percent of emulsifier. In the case of combinations of fatty acids with propylene glycol esters or glyceryl esters, the emulsions exhibit greater stability if the fatty acid component constitutes at least half of the emulsifier combination.

As stated hereinbefore, the physical state of the emulsifier system preferably used in the practice of our invention consists of an insoluble emulsifier component that is preferentially but incompletely wet by the oil phase. Where the insoluble emulsifier component is not preferentially wet by the margarine oil, preferential wetting by the oil phase can be achieved by incorporating into the margarine oil emulsifiers that remain dissolved in the oil during the formation of the emulsion.

An alternative emulsifier system consists of emulsifying agents that remain dissolved in the margarine oil during the formation of the emulsion, and which form a condensed interfacial film at the oil-water interface.

Emulsifier systems that may be used in the practice of this invention include (a) a phospholipid insoluble in both water and the oleaginous ingredients in combination with a compound selected from the group consisting of 12–22 carbon atom fatty acids and hydroxy esters of a polyol with a 12–22 carbon atom fatty acid; (b) a 12–22 carbon atom fatty acid in combination with a hydroxyester of a polyol with a 12-22 carbon atom fatty acid; (c) hydroxyesters of a polyol with a 12-22 carbon atom fatty acid containing at least two hydroxy groups on nonadjacent carbon atoms; and (d) an hydroxy monoester of a polyol with a 12-22 carbon atom fatty acid that is insoluble in both the oil phase and the water phase in combination with an oil soluble hydroxyester of a polyol with a 12-22 carbon fatty acid.

In the above-described systems (a), (b) and (d), the polyols are preferably selected from the class consisting of propylene glycol, glycerol, sorbitan, monosaccharides and oligosaccharides. In all of the systems mentioned above employing a combination of emulsifiers, preferably each component of the combination comprises at least 10 percent of the total emulsifier content. In system (b) the fatty acid component is preferably at least half of the emulsifier combination. In system (c) the oil-soluble component is preferably at least half of the emulsifier combination.

In the compositions of this invention, conventional margarine additives may be added such as salt and other flavoring agent, coloring agents, preservatives, etc.

In the margarine-substitute products illustrated in the examples given hereinafter, in addition to salt, the flavor employed may comprise any of those that are accepted for use in edible products and frequently comprises diacetyl and other ketones, butyric acid and other acids, ethyl butyrate and other esters.

Examples of coloring agents useful in providing the desired color to the margarine-substitute product of this invention are carotene, annatto, etc.

Among the preservatives which may be incorporated in the margarine-substitute product of this invention are benzoic acid, sorbic acid and the appropriate salts of the foregoing acids.

Also, when desired, our products may include antioxidants that are acceptable for use in edible fats and oils. Among these are: normal propyl gallate, the several tocopherols, butylated hydroxyanisole (BHA), butylated hydroxytoluene (BRT), nordihydroguaiaretic acid (NDGA).

As indicated hereinbefore, the oleaginous ingredients are in an amount from 20 to 55% by weight and consist essentially of an oleaginous material including 0.1 to 15% by weight of an emulsifying system. The oleaginous material, exclusive of the emulsifying system, is generally a glyceride ester of a 12 to 22 carbon atom fatty acid, preferably a triglyceride ester of 16 to 18 carbon atom fatty acid; e.g. cottonseed oil. Of course, the oleaginous material may be mixtures of esters of the aforedescribed type. Lower carbon atom fatty acid triglyceride esters such as cocoanut and palm kernal oil may also be judiciously employed. Thes oils or fats may be isomerized or modified and subjected to selective or non-selective hydrogenation in varying degrees. The fat or mixture of fats are typical of those used in conventional margarine technology.

When the low level of emulsifier is used, a higher melting point fat should be selected. Also, for better stability with lower emulsifying levels, homogenization and rapid cooling techniques are employed.

The following Examples A to H illustrate a number of different materials which may be used as the oleaginous component in accordance with this invention.

*Example A*

Pressed palm kernal oil:
Melting point, ° F. _____ 89
Solids content Index:
  50° F. _____ 59.4
  70° F. _____ 44.5
  90° F. _____ 0.5

*Example B*

Partially hydrogenated corn oil:
Melting point, ° F. _____ 103
Solid content index:
  50° F. _____ 46.6
  70° F. _____ 32.6
  90° F. _____ 7.5

*Example C*

Cottonseed oil:
Iodine value (approx.) _____ 108
Free fatty acid, percent (max.) _____ .05

*Example D*

A cocoanut oil rearranged with domestic vegetable oil:
Melting point, ° F. _____ 92
Iodine value _____ 45-50

*Example E*

A rearranged hardened cocoanut oil containing ½% lecithin:
Melting point, ° F. _____ 94-96
Iodine value _____ 1-2
Solid content index:
  50° F. _____ 64
  70° F. _____ 55
  80° F. _____ 39
  92° F. _____ 9
  104° F. _____ 0

*Example F*

Partially hydrogenated corn oil—A margarine oil in which one portion of the oil is selectively hydrogenated to a degree in excess of that characteristic of whole margarine fats and the other portion to a compensating lesser degree:
Melting point, ° F. _____ 94
Solid content index:
  50° F. _____ 26.5
  70° F. _____ 14.4
  80° F. _____ 8.9
  92° F. _____ 2.3

*Example G*

Margarine oil made from cottonseed oil:
Melting point, ° F. _____ 97
Free fatty acid, percent (max.) _____ .05
Solid content index:
  50° F. _____ 27
  70° F. _____ 17
  92° F. _____ 4

*Example H*

Partially hydrogenated corn oil:
Melting point, ° F. _____ 97
Solid content index:
  50° F. _____ 40.6
  70° F. _____ 24.9
  80° F. _____ 17.3
  92° F. _____ 5.7

*Example I*

Hydrogenated cottonseed and soy oil:
Melting point, ° F. _____ 99
Solid content index:
  50° F. _____ 75
  70° F. _____ 70
  80° F. _____ 61
  92° F. _____ 25
  104° F. _____ 0

*Example J*

Liquid corn oil:
Iodine value (approx.) _____ 123
Free fatty acid, percent (max.) _____ 0.05

Additional examples of materials useful as the oleaginous component are the "Wecobee" oils which are hard butters produced from coconut oil. These oils contain a small amount (0.25%) of lecithin.

Examples of such oils are "Wecobee W" which has a M.P. of 94–96° F. with an iodine value of 10 max., and "Wecobee R" which has a M.P. of 101–103° F. with an iodine value of 4 max.

In general, the pH of the water phase is adjusted to 4 to 7. The preservative and color are added to the phase in which it is most soluble. Flavoring ingredients are generally added at the lowest practical temperature. After preparing the separate oil and water phases, the water phase is added slowly to the oil phase, with slow speed agitation. The resulting emulsion may be then cooled further, homogenized, chilled and packaged appropriately.

A number of typical formulations are now given of margarine-substitute products formed in accordance with the present invention. In preparing such formulations, the following general procedure may be employed.

The oil phase and water phase are heated separately to a high enough temperature to melt or dissolve the components present. The water phase is added slowly to the oil phase while stirring with a laboratory stirrer. After complete addition of the water phase, stirring is continued at the highest speed that would avoid splashing. The resulting batch is then agitated sufficiently to disperse the aqueous phase in the oil phase. The resulting emulsion may then be homogenized, chilled and packaged appropriately.

The following is a detailed description of a specific method that may be used for the preparation of the low-calorie margarine-substitute products of this invention, following the general procedure outlined above.

(1) Mix and heat water and water-soluble components to desired temperature, e.g. 95° F.

(2) Mix and heat fat components and emulsifiers to 140° F. to ensure complete melting and, then, cool to desired mixing temperature, e.g. 95° F.

(3) Weigh out 160 gms. of fat phase into a 600 ml. beaker (for a 40% fat product).

(4) With constant agitation at about 400 r.p.m. add 240 gms. of aqueous phase. The addition time should be 1 minute.

(5) As the water is added, the agitation is increased. Final speed is about 900–1,000 r.p.m.

(6) Mix at the high speed for 3 minutes.

(7) At the end of the mixing, the sample is hand homogenized twice.

(8) The product is collected in an aluminum mold approximately 1¼" x 1¼" x 5" in which pre-folded foil laminated paper has been placed.

(9) The molded sample is held at 20° F. for 20–30 minutes and, then, the temperature is increased to 40° F.

In all of the examples which follow, the amounts given are by weight. Following each of the examples, the flow point (F.P.) and penetrometer reading (P.R.) at 40° F. are given. In the examples wherever used, Centrophil IP is an example of a phospholipid material and has the following composition:

|  | Percent |
|---|---|
| Chemical lecithin | 2.5 |
| Chemical cephalin | 20 |
| Inositol phosphatides | 38.5 |
| Moisture and sugar | 6 |
| Cottonseed oil carrier | 33 |

*Example 1*

| Margarine oil of Example H | percent | 40 |
|---|---|---|
| Centrophil IP | do | 5 |
| Stearic acid | do | 5 |
| Salt | do | 2.5 |
| Water | do | 47.5 |
| Preservative, color, flavor | | Sufficient |
| F.P. | ° F | 91–92 |
| P.R. | do | 86 |

*Example 2*

| Margarine oil of Example H | percent | 40 |
|---|---|---|
| Centrophil IP | do | 5 |
| Palmitic acid | do | 5 |
| Salt | do | 2.5 |
| Water | do | 47.5 |
| Preservative, color, flavor | | Sufficient |
| F.P. | ° F | 90–92 |
| P.R. | do | 87 |

*Example 3*

| Margarine oil of Example H | percent | 40 |
|---|---|---|
| Sorbitan trioleate | do | 10 |
| Salt | do | 2.5 |
| Water | do | 47.5 |
| Preservative, color, flavor | | Sufficient |
| F.P. | ° F | 82–83 |
| P.R. | do | 87 |

*Example 4*

| Margarine oil of Example H | percent | 40 |
|---|---|---|
| Sorbitan trioleate | do | 8 |
| Sorbitan monooleate | do | 2 |
| Salt | do | 2.5 |
| Water | do | 47.5 |
| Preservative, color, flavor | | Sufficient |
| F.P. | ° F | 86–87 |
| P.R. | do | 87 |

*Example 5*

| Margarine oil of Example H | percent | 40 |
|---|---|---|
| Sorbitan trioleate | do | 5 |
| Palmitic acid | do | 5 |
| Salt | do | 2.5 |
| Water | do | 47.5 |
| Preservative, color, flavor | | Sufficient |
| F.P. | ° F | 88–90 |
| P.R. | do | 65 |

*Example 6*

| Margarine oil of Example H | percent | 15.0 |
|---|---|---|
| Mixed fatty acids of corn oil (Emery 630) | percent | 4.0 |
| Centrophil IP | do | 1.0 |
| Water | do | 80.0 |
| Preservative, color, flavor | | Sufficient |
| F.P. | ° F | 103.0 |
| P.R. | do | 124 |

*Example 7*

| Margarine oil of Example H | percent | 40 |
|---|---|---|
| Sorbitan monopalmitate | do | 2 |
| Palmitic acid | do | 8 |
| Salt | do | 2.5 |
| Water | do | 47.5 |
| Preservative, color, flavor | | Sufficient |
| F.P. | ° F | 83–94 |
| P.R. | do | 37 |

*Example 8*

| Margarine oil of Example A | percent | 7.5 |
|---|---|---|
| Margarine oil of Example C | do | 12.35 |
| Margarine oil of Example H | do | 19.5 |
| Centrophil IP | do | 0.15 |
| Stearic acid | do | 0.25 |
| Palmitic acid | do | 0.25 |
| Salt | do | 3.0 |
| Water | do | 57.0 |
| Preservative, color, flavor | | Sufficient |
| F.P. | ° F | 89.6 |
| P.R. | do | 83 |

Example 9

| | | |
|---|---|---|
| Margarine oil of Example A | percent | 10.0 |
| Margarine oil of Example H | do | 29.1 |
| Centrophil IP | do | .12 |
| Stearic Aicd | do | .75 |
| Salt | do | 2.5 |
| Water | do | 57.53 |
| Preservative, color, flavor | Sufficient | |
| F.P. | ° F | 93.2 |
| P.R. | do | 45 |

Example 10

| | | |
|---|---|---|
| Margarine oil of Example A | percent | 15.6 |
| Margarine oil of Example C | do | 24.0 |
| Centrophil IP | do | .15 |
| Stearic Acid | do | 1.0 |
| Salt | do | 2.5 |
| Water | do | 56.75 |
| Preservative, color, flavor | Sufficient | |
| F.P. | ° F | 96.8 |
| P.R. | do | 83 |

Example 11

| | | |
|---|---|---|
| Margarine oil of Example A | percent | 15.0 |
| Margarine oil of Example C | do | 24.0 |
| Centrophil IP | do | .14 |
| Stearic Acid | do | .7 |
| Salt | do | 2.5 |
| Water | do | 57.66 |
| Preservative, color, flavor | Sufficient | |
| F.P. | ° F | 83.0 |
| P.R. | do | 75 |

Example 12

| | | |
|---|---|---|
| Margarine oil of Example A | percent | 10.0 |
| Margarine oil of Example C | do | 29.2 |
| Centrophil IP | do | .35 |
| Stearic Acid | do | .4 |
| Salt | do | 2.5 |
| Water | do | 57.55 |
| Preservative, color, flavor | Sufficient | |
| F.P. | ° F | 65 |
| P.R. | do | 101 |

Example 13

| | | |
|---|---|---|
| Margarine oil of Example A | percent | 15.8 |
| Margarine oil of Example C | do | 23.7 |
| Centrophil IP | do | .25 |
| Stearic Acid | do | .25 |
| Salt | do | 2.5 |
| Water | do | 57.5 |
| Preservative, color, flavor | Sufficient | |
| F.P. | ° F | 72.5 |
| P.R. | do | 86 |

Example 14

| | | |
|---|---|---|
| Margarine oil of Example A | percent | 7.5 |
| Margarine oil of Example C | do | 11.85 |
| Margarine oil of Example H | do | 19.5 |
| Centrophil IP | do | .15 |
| Stearic Acid | do | .5 |
| Palmitic Acid | do | .5 |
| Salt | do | 3.0 |
| Water | do | 57.0 |
| Preservative, color, flavor | Sufficient | |
| F.P. | ° F | 95.0 |
| P.R. | do | 63 |

Example 15

| | | |
|---|---|---|
| Margarine oil of Example A | percent | 7.5 |
| Margarine oil of Example C | do | 11.85 |
| Margarine oil of Example H | do | 19.5 |
| Centrophil IP | do | .15 |
| Stearic Acid | do | 1.0 |
| Salt | do | 3.0 |
| Water | do | 57.0 |
| Preservative, color, flavor | Sufficient | |
| F.P. | ° F | 93.2 |
| P.R. | do | 74 |

Example 16

| | | |
|---|---|---|
| Margarine oil of Example A | percent | 11.8 |
| Margarine oil of Example C | do | 17.25 |
| Margarine oil of Example H | do | 9.8 |
| Centrophil IP | do | .15 |
| Stearic Acid | do | 1.0 |
| Salt | do | 3.0 |
| Water | do | 57.0 |
| Preservative, color, flavor | Sufficient | |
| F.P. | ° F | 76 |
| P.R. | do | 98 |

Example 17

| | | |
|---|---|---|
| Margarine oil of Example A | percent | 7.5 |
| Margarine oil of Example H | do | 19.4 |
| Margarine oil of Example C | do | 12.6 |
| Centrophil IP | do | 0.1 |
| Glyceryl Distearate (Kessler 33D25) [1] | do | 0.3 |
| Salt | do | 3.0 |
| Lactose | do | 1.0 |
| Water | do | 56.1 |
| Preservative, color, flavor | Sufficient | |
| F.P. | ° F | 80.6 |
| P.R. | do | 82 |

[1] Kessler 33D25 is a mixture of mono-, di-, and tri-esters of stearic acid (90% pure) and glycerol.

Typical analysis:

| | | |
|---|---|---|
| Mono glyceride | percent | 14 |
| Di glyceride | do | 66 |
| Tri glyceride | do | 18.7 |
| Residual free fatty acid | do | 0.7 |
| Residual free glycerine | do | 0.6 |
| Iodine value | do | 0.1 |
| Melting point | ° C | 58.8 |

Example 18

| | | |
|---|---|---|
| Margarine oil of Example A | percent | 24 |
| Margarine oil of Example C | do | 11 |
| Stearic acid | do | 4 |
| Propylene glycol monostearate | do | 1 |
| Salt | do | 2.5 |
| Water | do | 57.5 |
| Preservative, color, flavor | Sufficient | |
| F.P. | ° F | 93 |
| P.R. | do | 64 |

Example 19

| | | |
|---|---|---|
| Margarine oil of Example H | percent | 24 |
| Margarine oil of Example C | do | 11 |
| Stearic acid | do | 4 |
| Glyceryl dioleostearate | do | 1 |
| Salt | do | 2.5 |
| Water | do | 57.5 |
| Preservative, color, flavor | Sufficient | |
| F.P. | ° F | 93 |
| P.R. | do | 68 |

Example 20

| | | |
|---|---|---|
| Margarine oil of Example H | percent | 26 |
| Margarine oil of Example C | do | 11 |
| Stearic acid | do | 2 |
| Glyceryl monooleate (Myverol 18–71E) | do | 1 |
| Salt | do | 2.5 |
| Water | do | 57.5 |

Example 21

| | | |
|---|---|---|
| Margarine oil of Example H | percent | 28.0 |
| Margarine oil of Example C | do | 11.5 |
| Stearic acid | do | 0.34 |
| Glyceryl Monooleate | do | 0.16 |

| | |
|---|---|
| Salt _____percent__ | 2.50 |
| Water _____do____ | 57.50 |
| Preservative, color, flavor | Sufficient |
| F.P. _____° F__ | 82.4 |
| P.R. _____do____ | 91 |

*Example 22*

| | |
|---|---|
| Margarine oil of Example A _____percent__ | 15.8 |
| Margarine oil of Example C _____do____ | 23.7 |
| Stearic acid _____do____ | 0.4 |
| Centrophil I.P. _____do____ | 0.1 |
| Salt _____do____ | 3.2 |
| Lactose _____do____ | 3.0 |
| Water _____do____ | 53.8 |
| Preservative, color, flavor | Sufficient |
| F.P. _____° F__ | 75 |
| P.R. _____do____ | 85 |

As indicated heretofore, among the emulsifying systems useful in producing the low-calorie margarine-substitute products of this invention is the combination of a 12–22 carbon atom fatty acid and/or a phospholipid or and/or an hydroxyester of a polyol. With emulsifying systems of the aforementioned type, the level of emulsifying components may be quite low, e.g. 0.1 to 0.5%, preferably 0.15 to 0.25%, by weight of the total low calorie composition. When a fatty acid component is employed, it is generally in the range of 0.005 to 0.25% by weight, preferably .07 to .15%. Among the more preferred emulsifying systems employing a low level of emulsifiers is the combination of a fatty acid, a phospholipid, and at least one hydroxyester of a 12–22 carbon atom fatty acid and a polyol selected from the group consisting of propylene glycol, glycerol, sorbitol, monosaccharides and oligosaccharides.

The following Examples 23 to 27 illustrate the use of emulsifying systems of the types mentioned above employing a low level of emulsifying components.

*Example 23*

| | |
|---|---|
| Margarine oil of Example J _____percent__ | 19.00 |
| Margarine oil of Example B _____do____ | 11.85 |
| Margarine oil of Example I _____do____ | 6.65 |
| Butter fat _____do____ | 0.50 |
| Stearic acid _____do____ | 0.15 |
| Centrophil I.P. _____do____ | 0.02 |
| Propylene glycol monostearate _____do____ | 0.05 |
| Color-concentrate _____do____ | 0.004 |
| Flavor (oil soluble) _____do____ | 0.04 |
| Water _____do____ | 56.146 |
| Salt _____do____ | 3.00 |
| Lactose _____do____ | 2.50 |
| Flavor (water soluble) _____do____ | 0.02 |
| Preservative _____do____ | 0.10 |
| F.P. _____° F__ | 87 |
| P.R. _____do____ | 92 |

*Example 24*

| | |
|---|---|
| Margarine oil of Example J _____percent__ | 19.00 |
| Margarine oil of Example B _____do____ | 11.85 |
| Margarine oil of Example I _____do____ | 6.65 |
| Butter fat _____do____ | 0.50 |
| Stearic acid _____do____ | 0.15 |
| Centrophil I.P. _____do____ | 0.02 |
| Monogylcerides of liquid cottonseed oil __do____ | 0.07 |
| Color-concentrate _____do____ | 0.004 |
| Flavor (oil soluble) _____do____ | 0.04 |
| Water _____do____ | 56.146 |
| Salt _____do____ | 3.00 |
| Lactose _____do____ | 2.50 |
| Flavor (water soluble) _____do____ | 0.02 |
| Preservative _____do____ | 0.10 |
| F.P. _____° F__ | 89 |
| P.R. _____do____ | 95 |

*Example 25*

| | |
|---|---|
| Margarine oil of Example J _____percent__ | 19.00 |
| Margarine oil of Example B _____do____ | 11.85 |
| Margarine oil of Example I _____do____ | 6.65 |
| Butter fat _____do____ | 0.50 |
| Stearic acid _____do____ | 0.15 |
| Centrophil I.P. _____do____ | 0.02 |
| Propylene glycol monostearate _____do____ | 0.05 |
| Monogylcerides of liquid cottonseed oil __do____ | 0.07 |
| Color-concentrate _____do____ | 0.004 |
| Flavor (oil soluble) _____do____ | 0.04 |
| Water _____do____ | 56.146 |
| Salt _____do____ | 3.00 |
| Lactose _____do____ | 2.50 |
| Flavor (water soluble) _____do____ | 0.02 |
| Preservative _____do____ | 0.10 |
| F.P. _____° F__ | 89 |
| P.R. _____do____ | 98 |

*Example 26*

| | |
|---|---|
| Margarine oil of Example B _____percent__ | 19.0 |
| Margarine oil of Example J _____do____ | 19.0 |
| Propylene glycol monostearate _____do____ | 0.2 |
| Decaglyceryl tristearate _____do____ | 0.5 |
| Monoglycerides of liquid cottonseed oil __ do____ | 0.1 |
| Color - concentrate _____do____ | 0.004 |
| Flavor (oil soluble) _____do____ | 0.02 |
| Water _____do____ | 55.8 |
| Salt _____do____ | 2.8 |
| Lactose _____do____ | 2.5 |
| Preservative _____do____ | 0.1 |
| F.P. _____° F__ | 81.5 |
| P.R. _____do____ | 109 |

*Example 27*

| | |
|---|---|
| Margarine oil of Example J _____percent__ | 19.25 |
| Margarine oil of Example B _____do____ | 12.0 |
| Margarine oil of Example I _____do____ | 6.75 |
| Centrophil I.P. _____do____ | 0.02 |
| Propylene glycol monostearate _____do____ | 0.05 |
| Monoglycerides of liquid cottonseed oil __ do____ | .07 |
| Color - concentrate _____do____ | 0.004 |
| Flavor (oil soluble) _____do____ | 0.04 |
| Water _____do____ | 56.05 |
| Salt _____do____ | 3.00 |
| Lactose _____do____ | 2.50 |
| Flavor (water soluble) _____do____ | .001 |
| Preservative _____do____ | 0.10 |
| F.P. _____° F__ | 89 |
| P.R. _____do____ | 95 |

In producing the low-calorie margarine-substitute products of Examples 23–27, the same general procedure used in producing the products of Examples 1–22 is employed. More particularly, the water phase containing salt, lactose (sweetener), potassium sorbate (preservative), water-soluble flavor and water is added to the oil phase comprising the remaining components of each of the Examples 23–27. The oil phase includes emulsifiers and the oil base stock. The resulting blend is mixed thoroughly to give a uniform emulsion after which the resulting emulsion is chilled and packaged.

The W/O emulsion products of Examples 23–27 contain low levels of emulsifying components in order to obtain final products of optimum mouth feel and melt down properties. Preferably, these compositions are made in accordance with the method of copending application Ser. No. 358,696 filed April 10, 1964 by Joseph George Spitzer, John J. Kearns and Owen Cooper since it permits a wider latitude in the processing conditions that may be employed in obtaining a product of good uniformity. The method of the aforementioned Spitzer et al. copending application comprises the following steps: (1) forming a low-calorie, liquid, water-in-oil coarse emulsion comprising a continuous oil phase of an edible oil, and a dispersed water phase of water droplets consisting of at least 45% and not more than 80% by weight of the total composition; (2) subjecting said coarse emulsion to appropriate forces to produce a fine emulsion which generally is of a higher viscosity than the coarse emulsion; and (3) converting the fine emulsion from a liquid to the plastic state by the quick-chilling thereof at a satisfactory crystallization rate for the edible oil so that the resulting plastic emulsion is of a consistency whereby the plastic emulsion is capable of being immediately packaged without causing emulsion breakdown.

A detailed description of the aforedescribed Spitzer et al. method for producing the low-caloried products of Examples 23 to 27 is now given: A coarse W/O emulsion is formed by intimately mixing, in suitable amounts and at appropriate temperatures, an oil phase containing an edible oil component and a water phase. In order to ensure complete emulsification it is desirable that when one phase is added to the other, e.g. adding the water phase to the oil phase, there be employed adequate agitation as well as a controlled rate of mixing, e.g. adding 3% of the water phase per minute. Also, both the water phase and oil phase when mixed should be at an elevated temperature to ensure proper mixing. For example, the water phase may be at a temperature in the range of 50 to 105° F., e.g. 86° F. and the oil phase at a temperature in the range of 80 to 140° F., e.g. 95° F. After the initial formation of the W/O emulsion, the emulsion is held at an elevated temperature for a sufficient period of time with continuous mixing to ensure the production of a uniform blend in the form of a coarse W/O emulsion. The coarse emulsion is maintained within a temperature of 73–113° F., e.g. 86–88° F., to ensure emulsion stability.

The coarse emulsion is then subjected to appropriate forces to produce a fine emulsion, whose water droplets are of a reduced size, and which is of a higher viscosity than the coarse emulsion. More particularly, the coarse emulsion is subjected to shearing forces by passing it to a colloid mill, e.g. to a Manton-Gaulin colloid mill at 0.035 inch opening. The resulting fine emulsion is then quick-chilled at a suitable rate, e.g. 0.1 to 3° F. per second, such as 1° F. per second, by feeding it through a scraped surface heat exchanger, e.g. a Votator, to convert it to a plastic product. Generally, the temperature at which the chilled emulsion assumes an appropriate consistency is 50–72° F., e.g. 59° F. The resulting plastic emulsion is then passed to conventional packaging equipment.

The low-calorie products of Examples 23–27 containing a low level of emulsifiers exhibit good stability, packing performance and use characteristics, including particularly good melt-down and mouth feel characteristics. In order to improve the margarine-like appearance of such compositions upon melting in frying applications, a small amount (e.g. 0.01 to 0.2% of the final composition) of a water-dispersible gum may be incorporated in the composition to maintain the desired viscosity of the aqueous phase upon melting of the emulsion. The gum may be added to the oil phase or the water phase prior to forming the emulsion. Examples of gums suitable for this purpose are ribbon tragacanth, gum guar, agar-agar, etc.

The invention in its broader aspects is not limited to the specific compositions described but departures may be made therefrom within the scope of the accompanying claims without departing from the principles of the invention and without sacrificing its chief advantages.

What is claimed is:

1. A stable plastic edible low-calorie margarine-substitute composition substantially free of non-modified proteinaceous matter and in the form of a water-in-oil emulsion having a flow temperature in the range of 65 to 105° F. and a penetrometer reading at 40° F. of 20 to 250, said composition consisting essentially of at least 45% by weight of water and from 20 to 55% by weight of oleaginous ingredients consisting essentially of an edible oil as the predominant oleaginous material and an emulsifying system in an amount of 0.1 to 15% by weight of the total composition selected from the group consisting of (a) a phospholipid insoluble in both water and the oleaginous ingredients in combination with a compound selected from the group consisting of 12–22 carbon atom fatty acids and hydroxy esters of a polyol selected from the class consisting of propylene glycol, glycerol, sorbitan, monosaccharides and oligosaccharides with a 12–22 carbon atom fatty acid; (b) a 12–22 carbon atom fatty acid in combination with a hydroxyester of a polyol selected from the class consisting of propylene glycol, glycerol, sorbitol, monosaccharides and oligosaccharides with a 12–22 carbon atom fatty acid; (c) hydroxyesters of sorbitan with a 12–22 carbon atom fatty acid containing at least two hydroxy groups on nonadjacent carbon atoms; and (d) an hydroxy monoester of a polyol selected from the class consisting of propylene glycol, glycerol, sorbitan, monosaccharides and oligosaccharides with a 12–22 carbon atom fatty acid, said monoester being insoluble in both the oil phase and the water phase, and being in combination with an oil soluble hydroxyester of a polyol selected from the class consisting of propylene glycol, glycerol, sorbitan, monosaccharides and oligosaccharides with a 12–22 carbon fatty acid.

2. A stable plastic edible low-calorie margarine-substitute composition according to claim 1, wherein the composition has a penetrometer reading at 40° F. in the range of 35 to 150.

3. A stable plastic edible low-calorie margarine-substitute composition according to claim 1, wherein the composition has a flow temperature in the range of 75 to 105° F.

4. A stable plastic edible low-calorie margarine-substitute composition according to claim 1, where the edible oil is a glyceride ester of a 12 to 22 carbon atom fatty acid.

5. A stable plastic edible low-calorie margarine-substitute composition according to claim 1, wherein the emulsifying system is in an amount from 0.1 to 2% by weight of the total composition and is a combination of a phospholipid and a 12–22 carbon atom fatty acid and wherein at least half of the emulsifier combination by weight is the fatty acid.

6. A stable plastic edible low-calorie margarine-substitute composition according to claim 1, wherein the emulsifying system is in an amount from 0.1 to 2% by weight of the total composition and is a combination of a phospholipid and an hydroxy ester of a polyol with a 12–22 carbon atom fatty acid selected from the group consisting of glyceryl monoesters, propylene glycol monoesters and glyceryl diesters and wherein at least half of the emulsifier combination by weight is the hydroxyester.

7. A stable plastic edible low-calorie margarine-substitute according to claim 1, wherein the emulsifier system is in an amount from 0.3 to 10% by weight of the total composition and is a combination of a 12–22 carbon fatty acid and a hydroxyester derived from a polyol with a 12–22 carbon atom fatty acid said polyol being selected from the group consisting of propylene glycol, glycerol, sorbitan, monosaccharides and oligosaccharides and wherein at least half of the emulsifier combination by weight is the fatty acid.

8. A stable plastic low-calorie margarine-substitute according to claim 1, wherein the emulsifying system is in an amount from 0.3 to 10% by weight of the total composition and is a sorbitan triester of a 12–22 carbon atom fatty acid.

9. A stable plastic low-calorie margarine-substitute composition according to claim 1, wherein the emulsifying system is in an amount from 0.3 to 10% by weight of the total composition and is a combination of a sorbitan monoester of a 12–22 carbon atom fatty acid and another hydroxyester of a polyol with a 12–22 carbon atom fatty acid selected from the group consisting of glyceryl monoesters, propylene glycol monoesters and glyceryl diesters, and wherein at least half of the emulsifier combination by weight is the latter hydroxyester.

10. A stable plastic low-calorie margarine-substitute composition according to claim 1, wherein the emulsifying system is the combination of a 12–22 carbon atom fatty acid, a phospholipid and a hydroxyester of a polyol with a 12–22 carbon atom fatty acid said polyol being selected from the group consisting of propylene glycol, glycerol, sorbitan, monosaccharides and oligosaccharides.

11. A stable plastic low-calorie margarine-substitute composition according to claim 1, wherein the emulsifying components are in an amount of 0.10 to 0.50% by weight of the total composition with the fatty acid component being in the range of 0.005 to 0.25% by weight.

12. A stable plastic low-calorie margarine-substitute composition having the following composition in parts by weight:

| | |
|---|---|
| Margarine oil | 39.5 |
| Stearic acid | .25 |
| Palmitic acid | .25 |
| Salt | 3.0 |
| Water | 56.85 |
| Phospholipid material | .15 | wherein the phospholipid material has the following analysis in percent by weight:

| | |
|---|---|
| Chemical lecithin | 2.5 |
| Chemical cephalin | 20 |
| Inositol phosphatides | 38.5 |
| Moisture and sugar | 6 |
| Cottonseed oil carrier | 33 |

13. A stable plastic edible low-calorie margarine-substitute composition having the following composition in parts by weight:

| | |
|---|---|
| Margarine oil | 38.00 |
| Stearic acid | 0.15 |
| Propylene glycol mono stearate | 0.05 |
| Water | 56.1 |
| Lactose | 2.5 |
| Salt | 3.0 |
| Phospholipid material | .02 | wherein the phospholipid material has the following analysis in percent by weight:

| | |
|---|---|
| Chemical lecithin | 2.5 |
| Chemical cephalin | 20 |
| Inositol phosphatides | 38.5 |
| Moisture and sugar | 6 |
| Cottonseed oil carrier | 33 |

14. A stable plastic edible low-calorie margarine-substitute composition having the following composition in parts by weight:

| | |
|---|---|
| Margarine oil | 38.00 |
| Stearic acid | 0.15 |
| Monoglycerides of liquid cottonseed oil | 0.07 |
| Water | 56.1 |
| Lactose | 2.5 |
| Salt | 3.0 |
| Phospholipid material | .02 | wherein the phospholipid material has the following analysis in percent by weight:

| | |
|---|---|
| Chemical lecithin | 2.5 |
| Chemical cephalin | 20 |
| Inositol phosphatides | 38.5 |
| Moisture and sugar | 6 |
| Cottonseed oil carrier | 33 |

15. A stable plastic edible low-calorie margarine-substitute composition having the following composition in parts by weight:

| | |
|---|---|
| Margarine oil | 38.00 |
| Stearic acid | 0.15 |
| Propylene glycol mono stearate | 0.05 |
| Monoglycerides of liquid cottonseed oil | 0.07 |
| Water | 56.1 |
| Lactose | 2.5 |
| Salt | 3.0 |
| Phospholipid material | .02 | wherein the phospholipid material has the following analysis in percent by weight:

| | |
|---|---|
| Chemical lecithin | 2.5 |
| Chemical cephalin | 20 |
| Inositol phosphatides | 38.5 |
| Moisture and sugar | 6 |
| Cottonseed oil carrier | 33 |

16. A stable plastic edible low-calorie margarine-substitute composition having the following composition in parts by weight:

| | |
|---|---|
| Margarine oil | 38.00 |
| Propylene glycol mono stearate | 0.05 |
| Monoglycerides of liquid cottonseed oil | 0.07 |
| Water | 56.05 |
| Lactose | 2.05 |
| Salt | 3.0 |
| Phospholipid material | .02 | wherein the phospholipid material has the following analysis in percent by weight:

| | |
|---|---|
| Chemical lecithin | 2.5 |
| Chemical cephalin | 20 |
| Inositol phosphatides | 38.5 |
| Moisture and sugar | 6 |
| Cottonseed oil carrier | 33 |

17. A stable plastic edible low-calorie margarine substitute composition according to claim 6 wherein the hydroxy ester is a glyceryl monoester.

18. A stable plastic edible low-calorie margarine substitute composition according to claim 6 wherein the hydroxy ester is a glyceryl diester.

19. A stable plastic edible low-calorie margarine substitute composition according to claim 18 wherein the glyceryl diester is glyceryl distearate.

20. A stable plastic edible low-calorie margarine substitute composition having the following composition in parts by weight:

| | |
|---|---|
| Margarine oil | 39.5 |
| Glyceryl distearate | 0.3 |
| Salt | 3.0 |
| Lactose | 1.0 |
| Water | 56.1 |
| Phospholipid | 0.1 | wherein the phospholipid material has the following analysis in percent by weight:

| | |
|---|---|
| Chemical lecithin | 2.5 |
| Chemical cephalin | 20 |
| Inositol phosphatides | 38.5 |
| Moisture and sugar | 6 |
| Cottonseed oil carrier | 33 |

References Cited

UNITED STATES PATENTS

| | | | |
|---|---|---|---|
| 2,402,690 | 6/1946 | Stanley | 99—123 |
| 2,422,633 | 6/1947 | Petersen | 99—123 |
| 2,508,393 | 5/1950 | Jaeger | 99—123 |

(Other references on following page)

UNITED STATES PATENTS

| | | | |
|---|---|---|---|
| 3,096,249 | 7/1963 | Prigal | 167—66 |
| 3,223,532 | 12/1965 | Pinkalla et al. | 99—123 |
| 3,232,765 | 2/1966 | Rosenthal et al. | 99—118 X |

OTHER REFERENCES

Griffen, W. C., "Cosmetics: Science and Technology," Interscience Publ., N.Y. 1957, pp. 998–1032, pp. 1012, 1029 relied on.

Markley, K. S., "Soybeans and Soybean Products," vol. 2, 1950, p. 605, Interscience Publ., N.Y.

Schwitzer, M. K., "Margarine and Other Food Fats," Interscience Publ., N.Y. 1956, pp. 235–236.

Spalton, "Pharmaceutical Emulsions and Emulsifying Agents," Publ. by Chemist and Druggist, 1953, pp. 16–19 and 66–70.

MAURICE W. GREENSTEIN, *Primary Examiner.*